United States Patent [19]

Minakuchi

[11] 4,153,864
[45] May 8, 1979

[54] MOTOR SPEED REGULATOR

[75] Inventor: Hiroshi Minakuchi, Shiga, Japan

[73] Assignee: Matsushita Electric Industrial Co., Ltd., Osaka, Japan

[21] Appl. No.: 839,497

[22] Filed: Oct. 5, 1977

[30] Foreign Application Priority Data

Oct. 13, 1976 [JP] Japan .................................. 51-123063

[51] Int. Cl.² ............................................... H02P 5/06
[52] U.S. Cl. .................................... 318/341; 318/342; 318/328; 318/346
[58] Field of Search .............. 318/326, 327, 328, 329, 318/341, 227, 230, 231, 330, 342, 346

[56] References Cited

U.S. PATENT DOCUMENTS

| | | | |
|---|---|---|---|
| 3,522,503 | 8/1970 | Feulner | 318/329 |
| 3,707,660 | 12/1972 | Nijhof et al. | 318/326 |
| 3,914,672 | 10/1975 | Kiwaki et al. | 318/341 |
| 3,970,909 | 7/1976 | Minakuchi | 318/341 |
| 4,015,180 | 3/1977 | Ietsugu et al. | 318/341 |

OTHER PUBLICATIONS

General Electric, SCR Manual, pp. 104–105, 7-2-65.

Primary Examiner—Gene Z. Rubinson
Assistant Examiner—Michael K. Mutter
Attorney, Agent, or Firm—Burgess, Ryan and Wayne

[57] ABSTRACT

An AC feedback circuit is interconnected through a choke coil between the input and output lines of a motor drive circuit so that negative feedback may be effected at a low frequency close to the cutoff frequency of the control system, and positive feedback may be effected at a high frequency. The carrier signal or the high frequency signal for controlling the switching may be generated within the drive circuit. Thus a switching type speed regulator which is simple in construction yet has high efficiency may be provided.

11 Claims, 7 Drawing Figures

MOTOR SPEED REGULATOR

BACKGROUND OF THE INVENTION

The present invention relates to a switching type motor speed regulator.

A typical prior art switching type speed regulator comprises a motor speed detection circuit comprising an AC generator coupled to a motor, a wave-shaping circuit for shaping the output from the AC generator into a rectangular waveform, a trigger pulse generator for converting this rectangular waveform output into a trigger pulse, a monostable multivibrator which is triggered by the trigger pulse from the trigger pulse generator for generating an output having a predetermined time length and a frequency dependent upon the frequency of the output signal from the AC generator, that is, the rotational speed of the motor, and an integrator for converting the AC output from the monostable multivibrator into a DC voltage which varies in response to the speed of the motor; a saw-tooth wave generator; a comparator for comparing the output from the saw-tooth wave generator with the output from the integrator and a drive circuit for generating the output signal for driving the motor in response to the output from the comparator.

When the speed of the motor exceeds a predetermined speed, the output voltage from the integrator rises so that the conduction time interval of the output transistor in the comparator becomes shorter and consequently the feed time in a switching cycle becomes shorter accordingly. As a result the speed of the motor drops. On the other hand when the speed of the motor drops below a predetermined speed, the conditions are reversed so that the speed is increased.

The average power supplied to the motor is controlled by the on-off or switching of the power to be supplied to the motor so that efficiency is very high. However as compared with the conventional speed regulators it additionally includes an oscillator or a saw-tooth wave generator so that it is complex in construction.

SUMMARY OF THE INVENTION

One of the objects of the present invention is therefore to provide a highly efficient switching type speed regulator which is simple in construction.

Another object of the present invention is to provide a speed regulator wherein an AC feedback circuit is interconnected between the input and output of a drive circuit of a motor so that the negative feedback may be effected at a relatively low frequency in the vicinity of a cutoff frequency of a control system, thereby improving the response of the control system and that the positive feedback may be effected at a high frequency which is used as a carrier signal for controlling the switching, whereby the carrier signal may be generated within the drive circuit.

Briefly stated, to the above and other ends the present invention provides a speed regulator comprising a motor speed detection circuit for detecting the rotational speed of a motor, a drive circuit including a feed control element coupled in series with the drive stage of the motor, the drive circuit being interconnected between the positive and negative terminals of a power supply and driving the motor in response to the output signal from the motor speed detection circuit, the power being supplied to the drive stage of the motor through a choke coil from the output electrode of the feed control element, and an AC feedback circuit interconnected between the junction point between the choke coil and the motor and an inverted input line of the drive circuit.

BRIEF DESCRIPTION OF THE DRAWINGS

Same reference numerals are used to designate similar parts throughout the figures.

DESCRIPTION OF THE PREFERRED EMBODIMENTS

Figure 1:
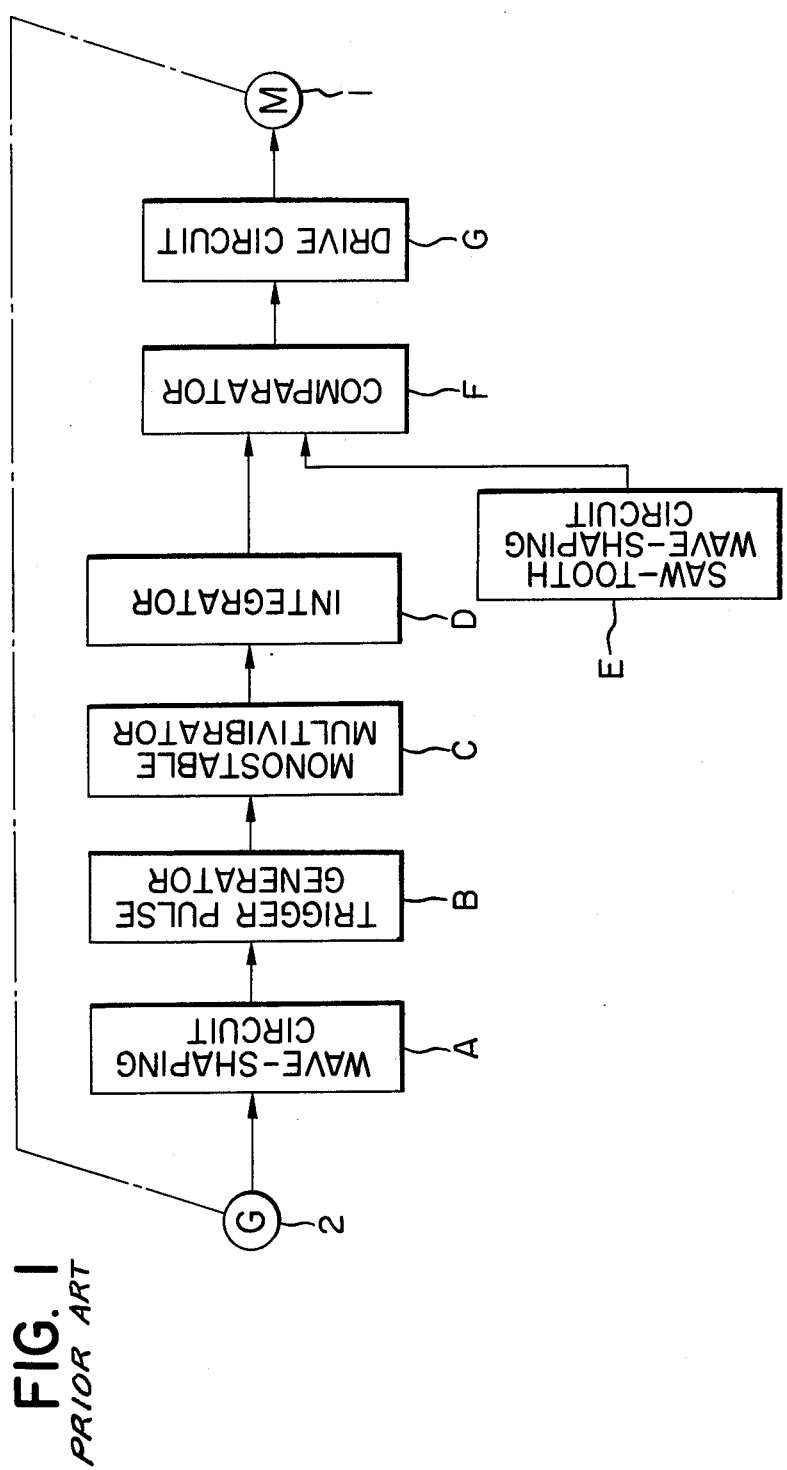
FIGS. 1 and 2 are block and circuit diagrams, respectively, of a prior art speed regulator.
Figure 2:
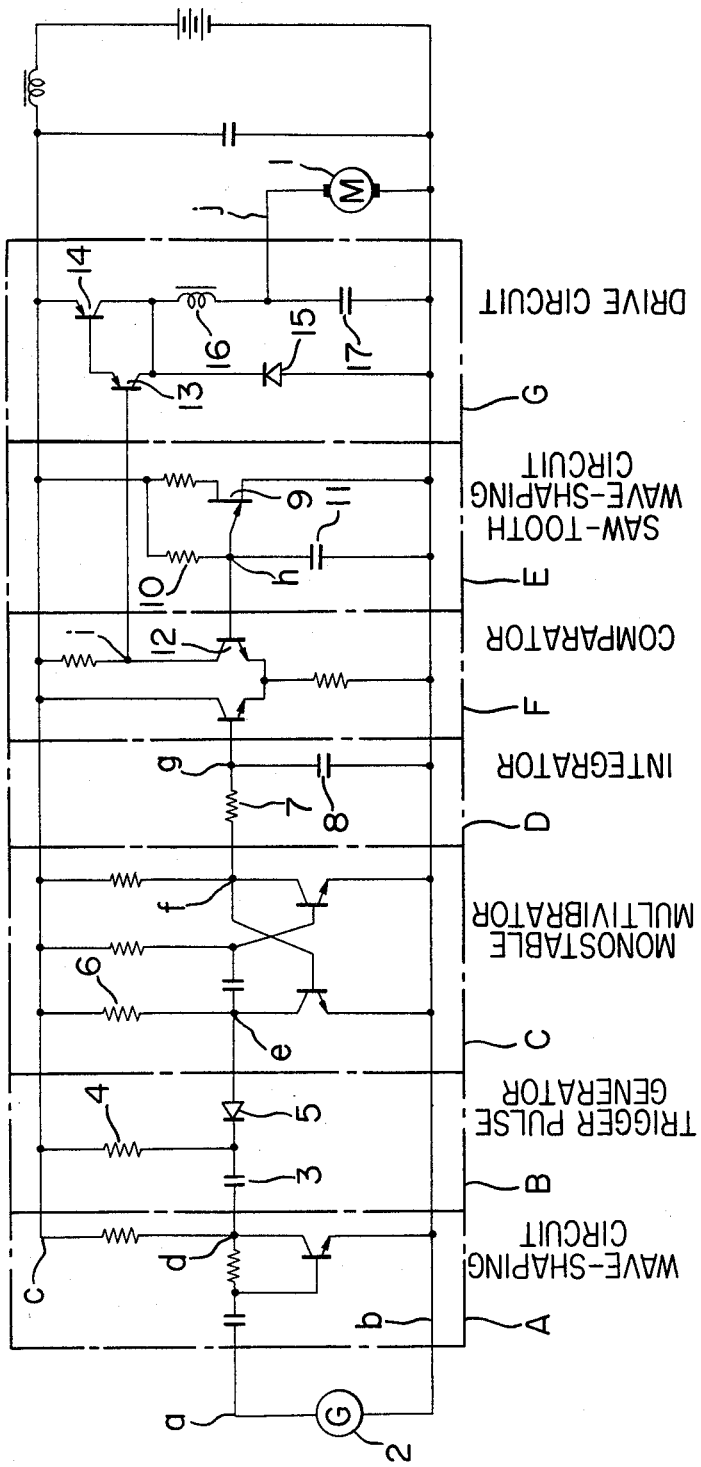

Prior Art, FIGS. 1 and 2

Prior to the description of the preferred embodiments of the present invention, the prior art speed regulator will be described with reference to the block and circuit diagrams shown respectively in FIGS. 1 and 2. First referring to FIG. 1 the output signal from an AC generator 2 which is connected to a motor 1 is shaped into an rectangular waveform by a signal waveform generator or wave-shaping circuit A and then shaped into an impulse-like trigger pulse by a trigger pulse generator B for triggering a monostable multivibrator C.

The rectangular output waveform from the monostable multivibrator C has a predetermined marking time, a predetermined spacing time and a repetition rate or frequency which is equal to the frequency of the output signal from the AC generator 2 and is dependent upon the rotational speed of the motor 1. Therefore with variation in speed of the motor 1 the marking time to spacing time ratio varies. The output from the monostable multivibrator C is applied to an integrator D so that a DC voltage which is dependent upon the rotational speed of the motor 1 may be derived.

Thus the AC generator 2, the wave-shaping circuit A, the trigger pulse generator B, the monostable multivibrator C and the integrator D constitute a circuitry for detecting the rotational speed of the motor 1.

The output from the integrator D is applied to a comparator F to which is also applied the output of a predetermined repetition frequency from a saw-tooth wave-shaping circuit E. The output from the comparator F is applied to a drive circuit G for driving the motor 1.

The prior art speed regulator is shown in detail in FIG. 2. The AC generator 2 is coupled through feed lines a and b to the wave-shaping circuit A, and a rectangular waveform output having an amplitude substantially equal to that of the voltage between the feed lines c and b and a frequency equal to the frequency of the output from the AC generator 2 is derived from an output terminal d.

The trigger pulse generator B comprises a differentiating circuit consisting of a capacitor 3 and a resistor 4 and a detector or a diode 5 and generates across a resistor 6 a train of negative pulses of a repetition frequency depending upon the frequency of the output from the AC generator 2.

The monostable multivibrator C shown in FIG. 2 is a most typical one. The potential at an output terminal f is normally maintained at nearly zero, but when a negative trigger pulse is impressed on an input terminal e, the potential at the output terminal f rises to the level equal to the potential on the feed line c for a predetermined time interval.

The integrator D consists of a resistor 7 and a capacitor 8, and a signal the voltage of which is dependent upon the rotational speed of the motor 1 is derived across the capacitor 8.

The saw-tooth wave-shaping circuit E comprises a relaxation oscillator consisting of a unijunction transistor 9, a resistor 10 and a capacitor 11, and the saw-tooth waveform output signal is derived from the emitter of the unijunction transistor 9.

The comparator F comprises an emitter-coupled differential amplifier. The outputs from the integrator D and the saw-tooth wave-shaping circuit E are applied to input terminals g and h, respectively, and when the former is higher than the latter, an output transistor 12 is enabled.

The drive circuit G comprises a Darlinton circuit consisting of PNP transistors 13 and 14, an idling diode 15 connected in the reverse direction, a series-connected circuit consisting of a choke coil 16 and a capacitor 17 and being coupled in parallel with the diode 15, and the motor 1 coupled in parallel with the capacitor 17.

Next the mode of operation will be described. Assume that the rotational speed of the motor 1 rises due to some cause. Then the output voltage from the integrator D rises so that the conduction time interval of the output transistor 12 in the comparator F becomes shorter accordingly. As a consequence a feed time interval in a switching cycle of the motor 1 becomes shorter so that the rotational speed of the motor 1 drops.

On the other hand when the rotational speed of the motor 1 drops below a predetermined speed, the conditions are reversed so that the speed of the motor 1 increases to a predetermined speed. Thus the motor 1 rotates at a predetermined speed regardless of the variation on load.

The average power supplied to the motor 1 is controlled by the on-off or the switching of the power supplied to the motor 1 so that the speed regulator described above with reference to FIGS. 1 and 2 is advantageous in that efficiency is very high, but as compared with the conventional speed regulators the oscillator such as the saw-tooth wave-shaping circuit must be added, resulting in a complex construction.

Figure 3:
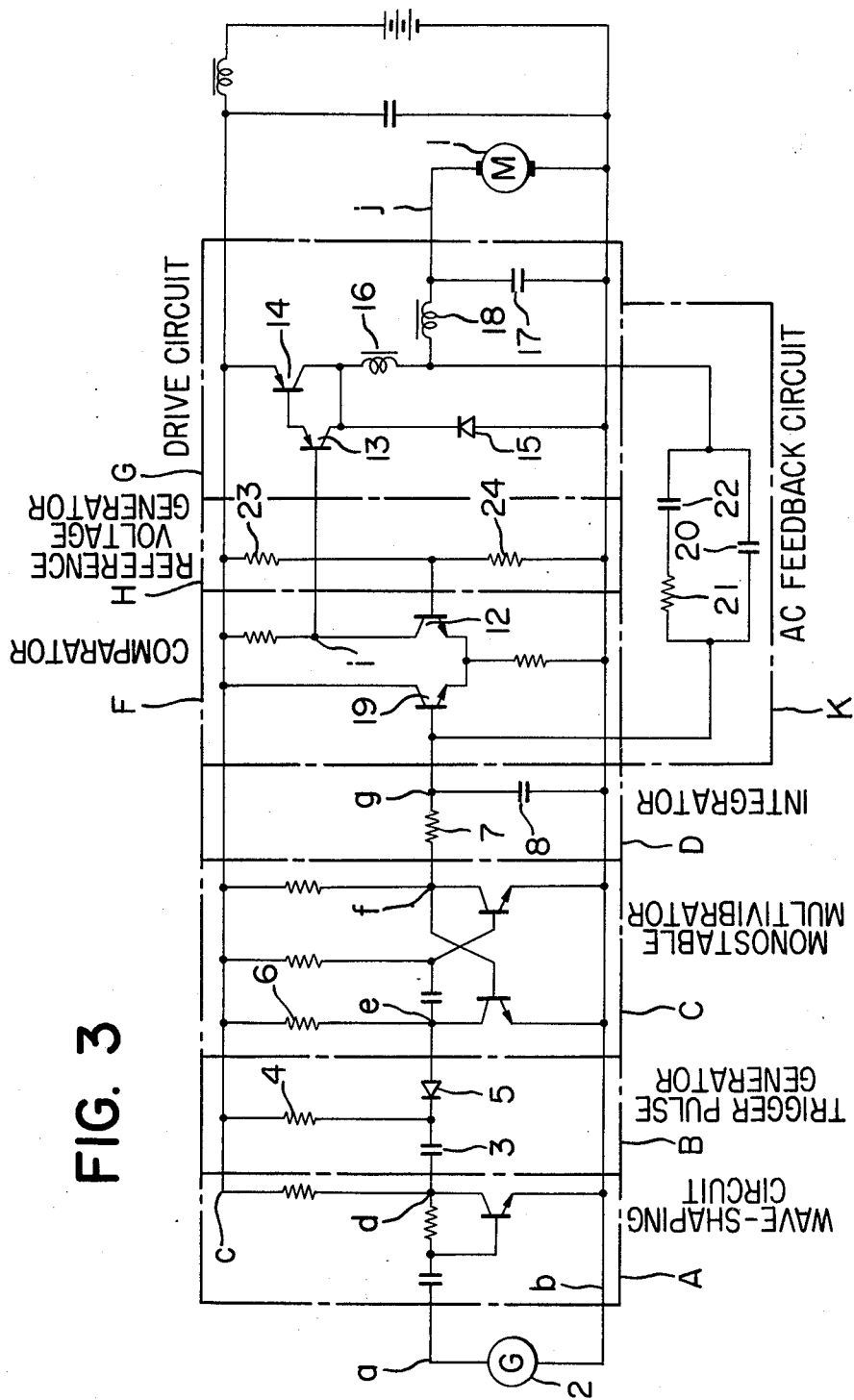
FIGS. 3 and 4 are circuit diagrams of first and second embodiments, respectively, of a speed regulator in accordance with the present invention.

First Embodiment, FIG. 3

In FIG. 3 there is shown a circuit diagram of a speed regulator in accordance with the present invention. In the first embodiment the diode 15 is interconnected in the reverse direction between the collectors of the transistors 13 and 14 and the negative feed line b, and the collector of the transistor 14 is connected through the chokes 16 and 18 to the motor 1. A capacitor 20 is interconnected between the choke coil 16 and the base of an input transistor 19 in the comparator F, and a circuit consisting of series-connected resistor 21 and capacitor 22 is coupled in parallel with the capacitor 20.

A reference voltage generator H consisting of resistors 23 and 24 connected in series is interconnected between the positive and negative feed lines c and b, and the junction point between the resistors 23 and 24 is connected to the base of the output transistor 12 in the comparator F.

The voltage at the base of the transistor 19 or at the junction point g is inverted in phase with respect to the voltage at the collector of the transistor 14. Therefore an AC feedback circuit K which is a two-port network consisting of the capacitor 20, the resistor 21 and the capacitor 22 and the choke coil 16 function as AC negative feedback circuits at a relatively low frequency (of the order of about a few Hz) very close to the cut-off frequency of a control system consisting of the circuit for detecting the speed of the motor 1 consisting of the AC generator 2, the wave-shaping circuit A, the trigger pulse generator B, the monostable multivibrator C and the integrator D and the drive circuit consisting of the comparator F, the drive circuit G and the motor 1 (the control system including the motor 1 when the latter is continuously loaded). Thus the gain of the control system may be increased and the transition response characteristic may be improved.

Since the feedback is effected through the choke coil 16, the AC feedback circuit K and the coke coil 16 function as AC positive feedback circuits at a high frequency (of a order of higher than a few KHz) at which the phase inversion of 180° occurs across the choke 16. As a result oscillation at a high frequency occurs. That is, the drive circuit functions as a kind of phase-shift oscillator. However this phase-shift oscillator is different from the normal phase-shift oscillators in that the oscillation is controlled by the output voltage from the circuit for detecting the speed of the motor 1.

In the first embodiment shown in FIG. 3, the rotational speed of the motor 1 is so controlled that the output voltage from the circuit for detecting the speed of the motor; that is, the voltage across the capacitor 8 may be equal to the reference voltage derived from the reference voltage generator H; that is, the voltage across the resistor 24. When the speed of the motor 1 exceeds the predetermined speed, the voltage at the junction point g rises and consequently the collector current flowing through the transistor 19 increases. As a result the emitter voltage of the transistor 12 rises so that the transistor 12 is disabled or almost driven into the non-conduction state. Then both the transistors 13 and 14 are disabled or almost driven into the non-conduction state so that the oscillation is completely interrupted or becomes extremely weak. As a consequence the motor 1 is almost not supplied with power so that its speed drops.

On the other hand, when the speed of the motor 1 drops below the predetermined speed, both the transistors 12 and 13 are saturated or almost driven into the saturated state so that the conduction time interval is automatically increased and consequently the average power supplied to the motor 1 is increased accordingly. Thus the rotational speed of the motor 1 is increased toward the predetermined speed.

When the motor 1 is started or excessively overloaded, the transistors 13 and 14 are saturated so that the oscillation is suspended.

As is clear from a comparison of the speed regulator shown in FIG. 3 with the prior art speed regulator shown in FIG. 2, the drive circuit of the present invention is used as a kind of phase-shift oscillator so that the saw-tooth wave-shaping circuit E may be eliminated. However the reference voltage generator H consisting of the resistors 23 and 24, the choke coil 18 and the AC feedback circuit K consisting of the capacitors 20 and 22 and the resistor 21 must be added. But the AC feedback circuit K serves to increase the gain of the control system and to improve the transition response characteristic. The choke coil 18 may be eliminated when the impedance across the motor 1 is not extremely low. Thus the increase in components is only two resistors 23 and 24 which constitute the voltage divider or the reference voltage generator H. Furthermore the components including the AC feedback circuit K between the collector of the transistor 14 and the junction point g or the inverted input line make up a directly-coupled amplifier so that when the speed regulator is fabricated in the form of a monolithic IC it is not required to extend terminals for exterior connection. Thus the design and fabrication of the circuit may be facilitated.

In the speed regulator shown in FIG. 2, even when the unijunction transistor is replaced with other transistors, the capacitor 11 cannot be eliminated so that terminals for interconnection of this capacitor must be provided.

Figure 4:
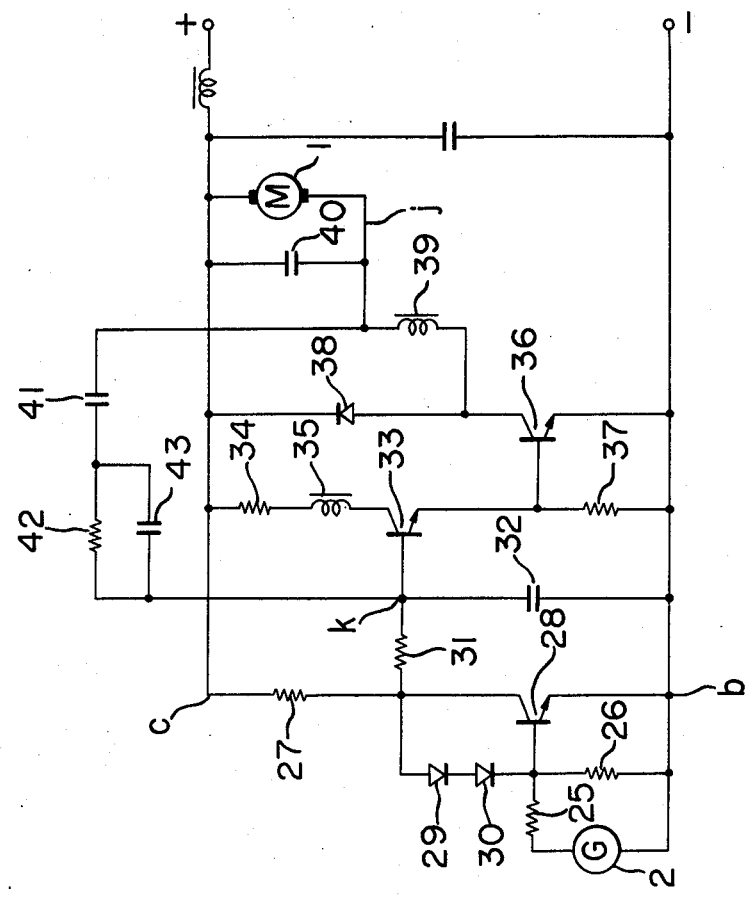

Second Embodiment, FIG. 4

In FIG. 4 there is shown a circuit diagram of the second embodiment of the present invention. Resistors 25, 26 and 27, a transistor 28 and diodes 29 and 30 constitute a switching circuit. The switching circuit, a smoothing circuit consisting of a resistor 31 and a capacitor 32 and the AC generator 2 constitute a circuit for detecting the speed of the motor 1.

A drive circuit comprises a drive transistor 33 coupled to the output of the circuit for detecting the speed of the motor, a resistor 34 and a choke coil 35 interconnected in series between the collector of the drive transistor 33 and the positive feed line c, a feed control transistor 36 having its base coupled to the emitter of the drive transistor 33, a resistor 37 interconnected between the base and emitter of the transistor 36, a diode 38 interconnected to the collector of the feed control transistor 36 and the positive feed line c, a choke coil 39 interconnected between the motor 1 and the collector of the feed control transistor 36 and a capacitor 40 interconnected between the junction between the choke coil 39 and the motor 1 and the positive feed line c. An AC feedback circuit consisting of a series circuit consisting of a capacitor 41 and a resistor 42 and a capacitor 43 coupled in parallel with the resistor 42 is coupled between the junction between the choke coil 39 and the motor 1 and the junction k at which an inverted input signal appears.

As with the first embodiment shown in FIG. 3, the drive circuit in the second embodiment also functions as a kind of phase-shift oscillator so that the power is delivered to the motor 1 depending upon the load thereon by the switching action of the feed control transistor 36.

The choke coil 35 coupled to the collector of the drive transistor 33 serves to derive a sharper switching waveform so that the switching efficiency may be improved. It may be coupled to the emitter of the drive transistor 33 for the same purpose.

The resistor 34 coupled in series to the choke coil 35 serves to avoid the flow of excessive current into the base of the feed control transistor 36. Therefore it may be eliminated if the choke coil 35 has a suitable DC resistance.

Figure 5:
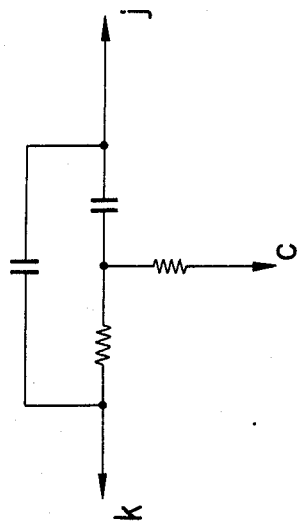

As described above the AC feedback circuit comprises the series circuit consisting of the capacitor 41 and the resistor 42 and the capacitor 43 coupled in parallel with the resistor 42. Alternatively, the AC feedback circuit shown in FIG. 3 may be used, and when it is not necessary to take the transient response characteristic of the control system into consideration, the resistor 42 and the capacitor 41 may be eliminated. That is, the AC feedback circuit may comprise only the capacitor 43. On the other hand, when it is desired to improve the transition response characteristic, the control gain and the efficiency of the control system, a three-port network or a partly grounded two-port network as shown in FIG. 5 may be used.

If the capacitor 32 has a high capacitance, the impedance at the junction k drops so that no oscillation occurs. However this problem may be solved by coupling a choke coil in series with the capacitor 32 so as to increase the impedance.

In both the first and second embodiments shown in FIGS. 3 and 4, the motor 1 is a DC motor incorporating a permanent magnet as a field coil. However when a DC motor with a field coil is used, the field coil may be used as the choke coil 16 or 18 in FIG. 3 or the choke 39 in FIG. 4.

When the speed regulator in accordance with the present invention is used in conjunction with a DC commutatorless motor, the driving unit thereof may be coupled instead of the motor 1.

Figure 6:
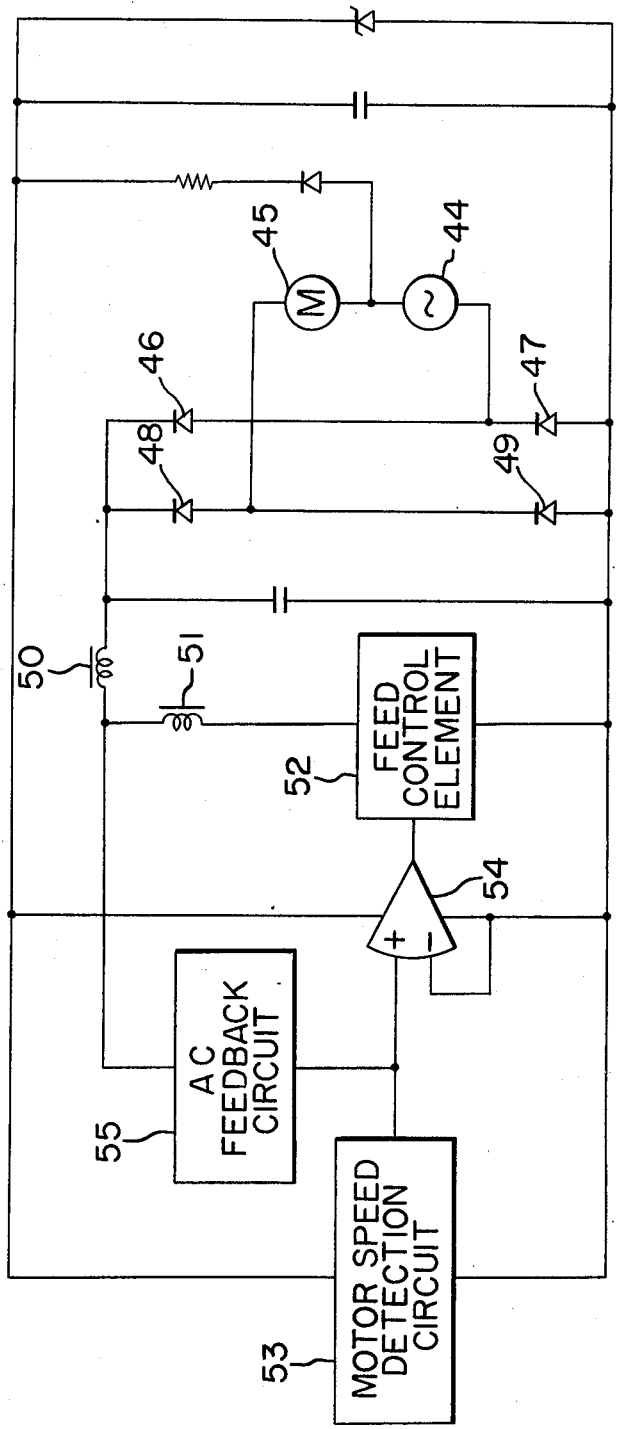
FIGS. 6 and 7 ar circuit diagrams of third and fourth embodiments, respectively, of the present invention.

When the regulator is used in conjunction with an AC motor, an AC motor 45 and a diode bridge consisting of diodes 46, 47, 48 and 49 are coupled to an AC power supply 44 as shown in FIG. 6, and a series circuit consisting of choke coils 50 and 51 and a feed control element 52 is coupled to the output terminals of the diode bridge.

In FIG. 6, reference numeral 53 denotes a circuit for detecting the speed of the motor; 54, an amplifier; 55, an AC feedback circuit; and 52, a conventional transistor or a thyristor with a suitable turn-off circuit or any other suitable active element.

Figure 7:
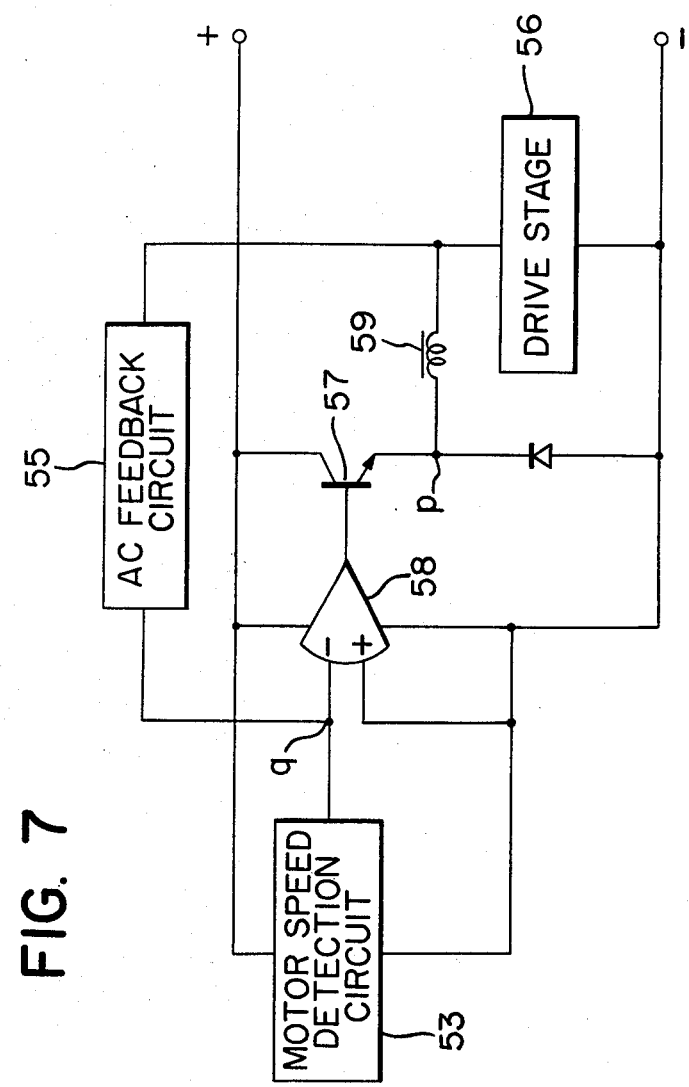

The preferred embodiments of the present invention described above may be summarized as shown in FIG. 7. That is, a feed control element 57 coupled in series with a drive stage 56 is interconnected between a power supply and a circuit 53 for detecting the speed of the motor. A drive circuit drives the motor through an amplifier 58 in response to the output signal from the motor speed detection circuit 53. The power is supplied to the drive stage 56 of the motor through a choke coil 59 from the output electrode p of the feed control element 57, and an AC feedback circuit 55 is interconnected between the junction between the choke coil 59 and the drive stage 56 and the inverted input line or the junction q of the drive circuit.

The inverted input line of the drive circuit is not necessarily coupled to the output of the speed detection circuit, and one end or terminal of the AC feedback circuit may be connected to the junction i instead of the junction point g (See FIG. 3).

The circuit 53 for detecting the speed of the motor need not necessarily include the AC generator. That is, the AC generator for detecting the rotational speed of the motor may be eliminated when, for instance, a method for detecting the voltage across the feed terminals of the DC motor during the time when the feed control transistor or element is disabled is employed.

What is claimed is:

1. A motor speed regulating device, comprising:
   a speed detecting circuit for providing an output signal indicative of the rotational speed of an electric motor;
   a drive circuit for said motor including a drive stage and a feed control element, said drive circuit driving said motor in response to an error control signal;

a comparator circuit for generating said error signal according to the difference between said output signal and a reference signal;

a choke coil coupled between said feed control element and said drive stage; and an AC feedback circuit coupled between the drive stage side of said choke coil and an input terminal of said comparator circuit, said feedback circuit providing negative feedback at frequencies below a predetermined cutoff frequency and positive feedback at a frequency substantially above said cutoff frequency, said regulating arrangement providing negative low frequency feedback for circuit stabilization and positive high frequency feedback to generate oscillations for periodically supplying drive current to said motor.

2. A motor speed regulating device according to claim 1, further comprising a DC amplifier between an input terminal of said drive stage and coupled to an output electrode of said feed control element.

3. A motor speed regulating device as set forth in claim 1 wherein said choke coil is a field coil of a DC motor.

4. A motor speed regulating device as set forth in claim 1 wherein a series circuit consisting of an AC motor and input terminals of a diode bridge is connected to an AC power supply, and a series circuit consisting of said choke coil and said feed control element is connected to the output terminals of said diode bridge.

5. A motor speed regulating circuit as set forth in claim 2 wherein a diode is coupled in the reverse direction between said output electrode and one of feed lines.

6. A motor speed regulating device as set forth in claim 2 wherein said feed control element comprises a transistor, and a second choke coil is coupled to the collector or emitter of a drive transistor which in turn is coupled to the input electrode of said transistor.

7. A motor speed regulating device as set forth in claim 2 wherein said AC feedback circuit comprises a two-port network including at lest two capacitors.

8. A motor speed regulating device as set forth in claim 7 wherein said AC feedback circuit comprises a series circuit consisting of a resistor and a first capacitor and a second capacitor connected in parallel with said resistor.

9. A motor speed regulating device as set forth in claim 7 wherein said AC feedback circuit comprises a series circuit consisting of a first capacitor and a resistor and a second capacitor connected in parallel with said series circuit.

10. A motor speed regulating device as set forth in claim 7 wherein said AC feedback circuit comprises a capacitor.

11. A motor speed regulating device as set forth in claim 2 wherein said AC feedback circuit comprises a threeport network including capacitors.

* * * * *

UNITED STATES PATENT OFFICE
CERTIFICATE OF CORRECTION

Patent No. 4,153,864          Dated May 8, 1979

Inventor(s) Hiroshi Minakuchi

It is certified that error appears in the above-identified patent and that said Letters Patent are hereby corrected as shown below:

In the title page, in column 2, under "References Cited U.S. Patent Documents": "Ietsugu et al." should be --Tetsugu et al.--.

Column 8, line 13: "lest" should be --least--.

Signed and Sealed this

Twentieth Day of November 1979

[SEAL]

Attest:

RUTH C. MASON
Attesting Officer

LUTRELLE F. PARKER
Acting Commissioner of Patents and Trademarks